Nov. 3, 1931.  R. G. BARNARD  1,830,524
INTERNAL PIPE CUTTER OR OIL WELL CASING CUTTER
Filed May 23, 1930  3 Sheets-Sheet 1

INVENTOR
R.G. BARNARD
BY
ATTORNEY

Nov. 3, 1931.    R. G. BARNARD    1,830,524
INTERNAL PIPE CUTTER OR OIL WELL CASING CUTTER
Filed May 23, 1930    3 Sheets-Sheet 2

INVENTOR
R. G. BARNARD
BY
ATTORNEY

Nov. 3, 1931.  R. G. BARNARD  1,830,524
INTERNAL PIPE CUTTER OR OIL WELL CASING CUTTER
Filed May 23, 1930  3 Sheets-Sheet 3

INVENTOR
R.G.BARNARD
BY
ATTORNEY

Patented Nov. 3, 1931

1,830,524

UNITED STATES PATENT OFFICE

RICHARD GEORGE BARNARD, OF UPPER BURMA, BRITISH INDIA, ASSIGNOR TO THE BURMAH OIL COMPANY LIMITED, OF GLASGOW, SCOTLAND, A BRITISH CORPORATION

INTERNAL PIPE CUTTER OR OIL WELL CASING CUTTER

Application filed May 23, 1930, Serial No. 455,096, and in Great Britain April 16, 1930.

This invention relates to an improved cutter for internally cutting pipes or tubes, such as the casings or linings of oil wells, water wells, bore holes and the like, with the object of severing the pipe or casing at any desired depth.

It is an object of the present invention to provide an efficient cutter by the aid of which the cutting of the pipe or casing at any desired depth can be efficiently and expeditiously accomplished. Further objects of the invention are to avoid any distortion of the pipe or casing on the completion of the severing operation and to provide a clean cut. It is also a further object of the invention to effect the cutting operation by the rotation of cutting tools having a positive feed which is capable of being adapted to specific requirements.

The cutter according to the present invention comprises one or more series of radially movable cutting tools, all arranged in the same transverse plane in a cutter head which is revolved about its axis and which is centered in the pipe or casing above and below the cutting tools by means of outwardly-pressed antifriction bearing members carried by the cutter head.

The invention also consists in a rotary cutter head housing a series of radially movable cutting tools arranged in the same transverse plane to successively operate upon the pipe or casing, the leading tool of said series of tools projecting further than the other tools of the series so as to effect an initial cut, while the other tools of the series act as clearance tools, cutting away the material at both sides of the initial cut, in order to facilitate the operation of the leading cutting tool and thus ensure a clean cut. The invention also contemplates the employment of a series of four cutting tools, the first of which is preferably a V-shaped cutter, while the second or main clearance cutter is a square cutting tool designed to cut a clearance at each side of the V-shaped cutter, the third and fourth cutting tools being side clearance cutters each designed to cut one side of the clearance made by the main clearance cutter and thus to provide ample clearance for the leading cutting tool.

A feature of the present invention is that the cutting tools are not rotatable in themselves or upon their own axes, but are radially slidable in the cutter head and are fed towards the work to effect the desired cut. In consequence thereof, the pipe or casing is severed without any flaring out or distortion of the cut ends of the pipe.

The cutter head is preferably centralized in the pipe or casing by the provision of annular series of balls urged outward preferably by means of springs, and the feed of the cutting tools is effected by causing the inner ends of the tools or their carriers to ride on the conical face of a feed cone axially movable along a fixed feed screw. The tool carriers may be dovetailed into longitudinal grooves in the feed cone. The latter is rotatable with the cutter head which rotates upon a centre bearing spindle fixed within the pipe or casing and supporting the central feed screw.

The cutting tools are retracted at the end of the feed by means such as springs which draw the cutting tools within the cutter head, when the cutting tools have passed over the larger end of the feed cone.

In order that the invention may be more clearly understood, reference is hereinafter made to the accompanying drawings in which Fig. 1 is a vertical sectional view of the cutter and Fig. 2 a vertical sectional view of a known type of drive-down trip casing spear used in connection with the cutter shown in Fig. 1.

Figure 1:
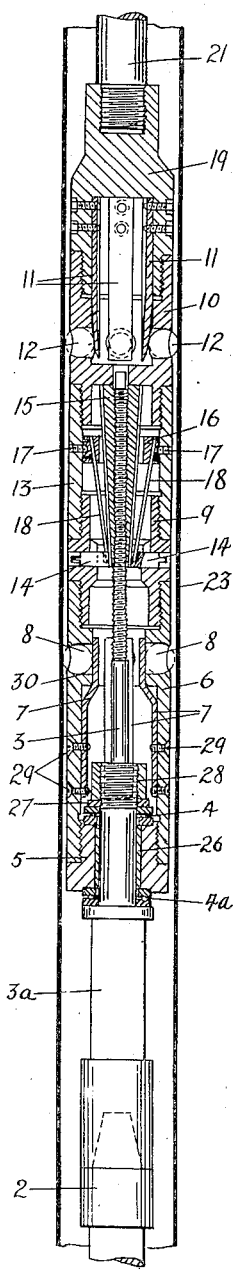
Figure 2:
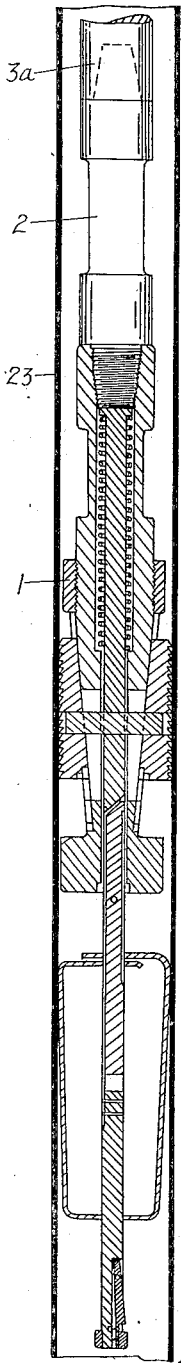

The lower end of the cutter head is revolubly supported upon a suitable fixed support secured within the lower part of the pipe or casing to be cut. For this purpose a known type of fitting is shown in Figs. 1 and 2, known as a "drive-down trip casing spear" and designated by the general reference character 1. This is secured by means of a suitable adapter 2 to the lower end 3a of a spindle or feed screw 3. The cutter head rotates about the spindle 3, being carried by a bearing sleeve 5 which rotates between ball bearings 4 and 4a on the spindle 3. Screwed or otherwise secured to the bearing sleeve 5 is a lower ball guide 6, having springs 7 which retain guide balls 8 in contact with the casing or pipe 23. Screwed or otherwise secured to the upper end of the ball guide 6 is a tool holder 9 which supports the cutting tools in carriers 14.

Figure 5:
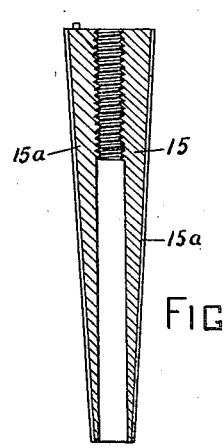
Figs. 5 and 6 are vertical sectional and plan views respectively of the feed cone.
Figure 6:
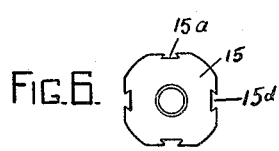

As shown in Figs. 10–14, the cutting tools are preferably secured by screwed studs 22 in recesses in tool boxes or carriers 14. The tool holder 9 is also connected by a connecting sleeve 13 to an upper ball guide 10, which supports guide balls 12 in apertures 20. The guide balls 12 are pressed against the pipe 23 by means of springs 11 which may be secured to an upper adapter or union member 19, into which is screwed the drill pipe or tubing 21, by means of which the cutter is rotated. A tool-spring holder 16 is securely fixed inside the sleeve 13, as by means of grub screws 17. Tool springs 18 are fixed at their upper ends to the holder 16, and the free ends of the springs 18 fit into elongated slots 25 (Figs. 10–14) in the tool carriers 14. The tool carriers 14 have dovetailed ends sliding in longitudinal grooves 15a in a feed cone 15 (Figs. 5 and 6).

The bearing sleeve 5 may be fitted with a bush 26 and the ball race 4 is held down upon the sleeve 5 by means of a washer 27 and a lock nut 28 fitted upon an enlarged portion of the spindle 3.

The springs 7, which retain the guide balls 8 in their operative position, may be attached to the inside of the lower guide 6 by means of screws 29, the guide 6 being provided with recesses or holes 30 within which the guide balls 8 operate.

Figure 3:
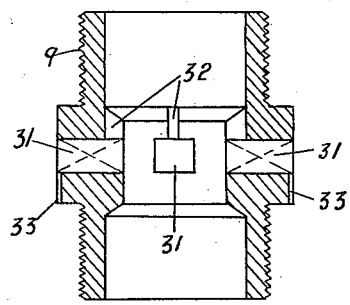
Fig. 3 is a vertical sectional view of the tool holder, and Fig. 4 a plan view of same.
Figure 4:
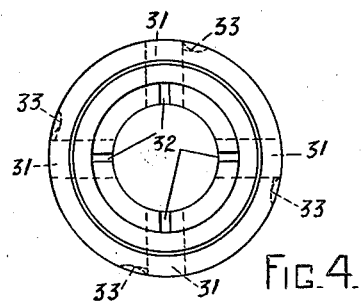

The tool holder 9, which is preferably constructed as shown in Figs. 3 and 4, is provided with a series of say four rectangular holes 31 through which the cutting tools are adapted to be projected by means of the feed cone 15. Grooves 32 may be cut in the enlarged inner portion of the holder 9 to allow the tools to be removed.

Figure 15:
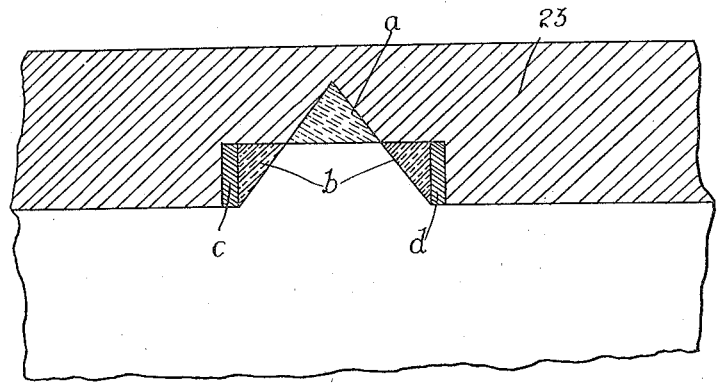

Each of the four cutting tools has a separate cutting operation, as shown in Fig. 15, the first tool 14a, which is slightly longer than the other three tools 14b, 14c and 14d, cutting out the portion a in the casing or pipe 23. The second tool 14b cuts out the portions b and the third and fourth tools 14c and 14d cut out the portions c and d respectively.

The method of operation is as follows:—

The spear 1 is secured to the casing cutter by means of the adapter or connecting piece 2. It is then necessary to ensure that the cutting tools are within the periphery of the holder 9 in their original position when running inside the casing or pipe 23, this position being with the feed cone 15 at the top of its travel on the feed screw 3. To accomplish this, the cutter head is rotated slowly by hand in an anti-clockwise direction until the cone 15 abuts against the bottom face of the upper ball guide 10. When the cone 15 is in this position the cutting tools will be within the cutter head.

The drill pipe or tubing 21 is then screwed into the upper adapter or connection 19 of the casing cutter and the whole is lowered by means of suitable lowering tackle (not shown) into the pipe or casing 23 to the desired length to be cut off. The spear 1 is then tripped in known manner to secure it to the inside of the casing or pipe 23.

The drill pipe or tubing 21 may be revolved at the surface by any suitable means, so as to turn the cutter head about the spindle 3 on the ball races 4 and 4a at the lower end of the cutter head, which is kept centralized at the top and bottom by means of the ball guides 6 and 10 and the balls 8 and 12. The rotation of the cutter head causes the feed cone 15 to travel downwards on the screw-threaded portion of the stationary spindle 3, and the downward travel of the feed cone 15 pushes the cutting tools out beyond the cutter head to the pipe or casing 23 which is to be cut, the rate of feed depending on the pitch of the screw. During this movement, the dovetailed ends of the tool carriers 14 slide in the grooves 15a of the feed cone 15.

Before running the casing cutter in the casing or pipe 23 which is to be cut off, tension is preferably put on the latter and it is held in tension during the cutting operation by means of a ring and wedges or other known means. After completion of the cut-off, as indicated by a release in the tension in the drill pipe or tubing 21, the drill pipe or tubing 21 should still be turned until the feed cone 15 travels down past the cutting tools. The cutting tool return springs 18 then come into action and draw the cutting tools back within the holder 9, whereupon the tool may be drawn out of the well.

According to the length of the feed cone 15 and the pitch of the thread on the feed screw 3, it is possible to determine exactly when the feed cone 15 is free from the tools. For example with a feed screw having a pitch of twelve threads per inch and length of feed cone twelve inches, the number of revolutions the cutter head will require to make to ensure that the top of the feed cone clears cutting tools is 144.

Figure 7:
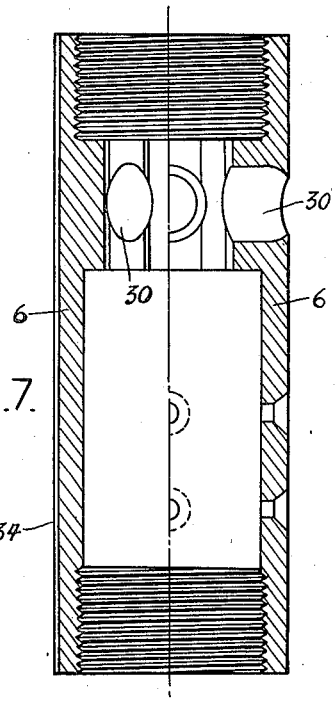
Fig. 7 is a vertical sectional view of the lower ball guide, one half being in section on the line A—A of Fig. 8 and the other half in section on the line B—B.
Figure 8:
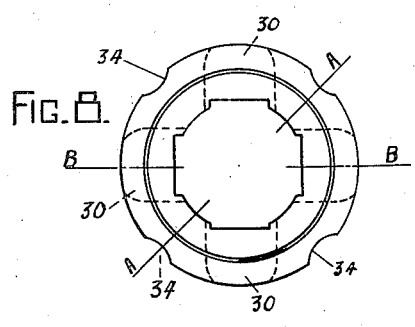
Fig. 8 is a plan view of the lower ball guide.
Figure 9:
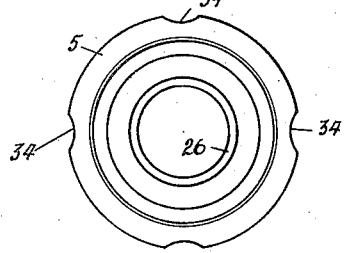
Fig. 9 is a plan view of the bearing sleeve.
Figure 10:
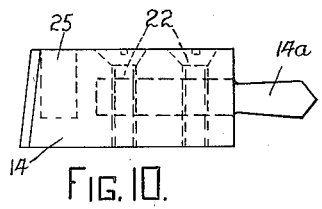
Figs. 10–14 are detail views of the four cutting tools and Fig. 15 shows the cycle of cutting operations.
Figure 11:
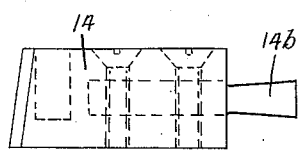
Figure 12:
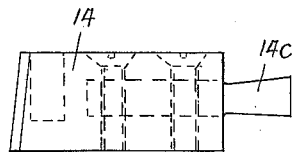
Figure 13:
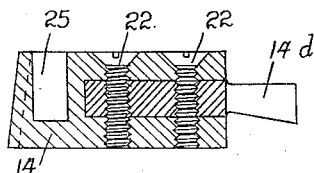
Figure 14:
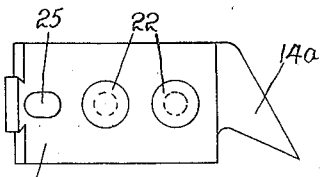

To provide clearance for the cuttings from the pipe 23, the tool holder 9 is recessed beneath and in rear of the tools as indicated at 33 (Figs. 3 and 4) and the ball guide 6 and bearing sleeve 5 are similarly grooved longitudinally at 34 as shown in Figs. 7, 8 and 9.

It will be noted that the cutting tools do not revolve upon their own axes like disc cutters, and consequently the tools cut with a planing action equal to that of a lathe tool or planing tool and effect a clean cut without pressing out or flaring the severed ends of the pipe or oil well casing. The feed cone 15 also effects a positive forward feed of the cutting tools and the speed of the feed can be adapted to suit specific requirements by employing a feed screw of the requisite pitch to give the required feed speed.

Although one series of four cutting tools is shown and described, it is to be understood that any desired number of clearance tools may be employed, and that two or more series of cutting tools all in the same transverse plane may be provided.

The centralizing balls 8 and 12 may be replaced by other anti-friction bearing members, such as rollers urged outwards by any suitable means.

Any suitable feed mechanism may also be employed in place of the feed cone for advancing the cutting tools during the cutting operation.

Claims:

1. An internal pipe cutter comprising a rotary cutter head, a series of radially movable planing tools comprising an initial cutter and clearance tools situated in the cutter head in the same transverse plane and in themselves non-rotatable, and anti-friction bearing members carried by the cutter head for centralizing the latter within the pipe above and below the cutting tools.

2. An internal pipe cutter comprising a rotary cutter head, means for centralizing it within the pipe above and below the cutters, and a series of four radially movable cutting tools all arranged in the same transverse plane and non-rotatably mounted in said cutter head, one of said cutting tools having a V-shaped cutting edge, the second of said tools having a square clearance cutting edge, and the other two tools having side clearance cutting edges.

3. An internal pipe cutter comprising a rotary cutter head, means for centralizing it within the pipe above and below the cutters, a series of radially movable cutting tools all arranged in the same transverse plane and non-rotatably mounted in said cutter head, a spindle adapted to be fixed within the pipe, a feed cone axially movable upon the spindle and adapted to press against the cutting tools, means for moving said cone along the spindle, and spring means for retracting the tools and disconnecting them from the feed cone when the wider end of the cone passes beyond the tools.

4. An internal pipe cutter comprising a rotary cutter head, a series of radially movable planing tools all arranged in the same transverse plane and non-rotatably mounted in said cutter head, and means for centralizing the cutter head within the pipe above and below the cutting tools comprising annular series of anti-friction elements carried by the cutter head, and means for urging said elements outwards against the pipe.

5. A cutter as specified in claim 4, wherein the anti-friction elements consist of balls pressed outwards by springs.

6. An internal pipe cutter comprising a central spindle adapted to be fixed within the pipe, a hollow cutter head rotatably supported upon said spindle, a series of radially movable cutting tools all arranged in the same transverse plane and non-rotatably mounted in said cutter head, means for centralizing the cutter head within the pipe above and below the cutters, a feed screw within the cutter head and fixed upon said spindle, a feed cone screw-threaded upon said feed screw, means whereby said tools are slidably interlocked with said feed cone, and spring means for retracting the tools when the wider end of the feed cone is moved beyond the cutters to disconnect the feed cone from the cutters.

7. An internal pipe cutter comprising a central spindle adapted to be fixed within the pipe, a hollow cylindrical sectional cutter head rotatably mounted upon said spindle, anti-friction elements carried by the upper and lower part of said cutter head for contact with the pipe, a series of radially movable non-rotary planing tools all arranged in the same transverse plane and slidably mounted in said cutter head between the anti-friction elements, a feed screw within the cutter head and supported by said spindle, a feed cone screw-threaded upon said screw and having longitudinal grooves on its periphery interlocked with the inner ends of said tools, and springs for retracting said tools within the periphery of the cutter head, when the wider end of the feed cone is moved beyond the cutters to disconnect the feed cone from the cutters.

In testimony whereof I have affixed my signature.

RICHARD GEORGE BARNARD.